Feb. 13, 1951.  E. E. WOODWARD  2,541,318
PISTON ALIGNING MECHANISM
Filed June 10, 1949

INVENTOR.
EDWARD E. WOODWARD
BY
Boyken, Mohler & Beckley
ATTORNEYS

Patented Feb. 13, 1951

2,541,318

UNITED STATES PATENT OFFICE 2,541,318

PISTON ALIGNING MECHANISM

Edward E. Woodward, San Francisco, Calif.

Application June 10, 1949, Serial No. 98,325

9 Claims. (Cl. 33—180)

This invention relates to a device for testing the alignment of pistons and more particularly to the alignment of pistons having heads with irregular surfaces, not perpendicular to the piston walls.

Conventional practice has developed several ways of testing and aligning pistons before the same are mounted in the cylinder block and connected with the connecting rod. The necessity for such alignment is obvious because if proper alignment of the piston walls with the crankshaft bearings is not maintained, excessive wear occurs and breakdowns are frequent.

Until recently, practically all pistons were provided with flat heads, perpendicular to the piston walls. This surface thus provided ready means for testing the alignment by means of a conventional square mounted on a flat surface. However, modern design has introduced many pistons having heads with irregular surfaces, making the old methods inadequate or impossible of use.

The present invention is designed to overcome the difficulties introduced by these irregular shaped heads and provides a mechanism for testing alignment regardless of the shape of the head.

Thus one of the objects of the invention is a device for testing the alignment of pistons, the heads of which are not at right angles to the walls thereof.

Another object of the invention is a means for testing the alignment of pistons whose heads do not provide a smooth surface, perpendicular to the walls thereof.

Still another object of the invention is a piston aligning tool which may be clamped on to a piston to provide a flat surface, perpendicular to the piston walls, for testing its alignment.

An even further object is a mechanism for mounting a piston and connecting rod on an axis corresponding to the crankshaft axis having means for providing a flat surface, perpendicular to the piston walls, for testing its alignment.

Figure 1:
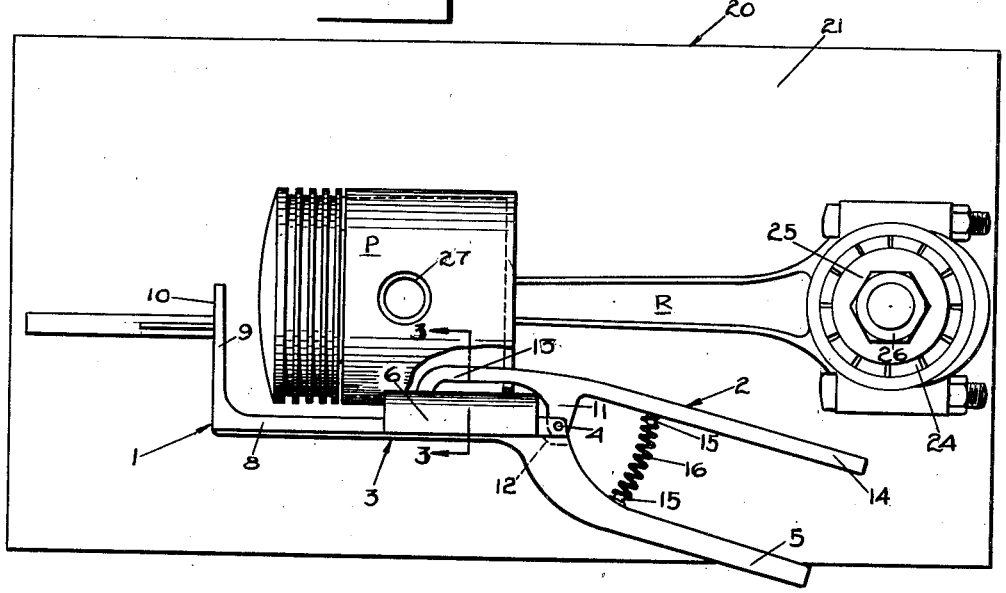
Fig. 1 is a plan view of the preferred form of mechanism for testing piston alignment, showing a piston mounted thereon, the latter being partially cut away to show the details of the device.

In general, the mechanism comprising the invention comprises a tool and associated mounting mechanism. The tool itself is provided with a flat surface and means for clamping the same at right angles to the wall of the piston. As will be seen in the preferred form, this surface is mounted in conjunction with other flat surfaces adapted to be secured against the piston walls in a manner to support said surface in a plane perpendicular to the walls.

The various surfaces are provided on a tool and means are provided to clamp the piston onto the tool. Associated mechanism is provided to mount the piston and tool on an axis equivalent to the crank-shaft axis in order that it may easily be determined, by means of a square, whether the piston walls are properly aligned with respect to the crank-shaft axis.

The preferred form of the tool, together with its associated mechanism is shown in the drawings. It is to be clearly understood that the form shown is illustrative only and that other forms will be obvious to those skilled in the art and are intended to be covered by the claims.

Figure 2:
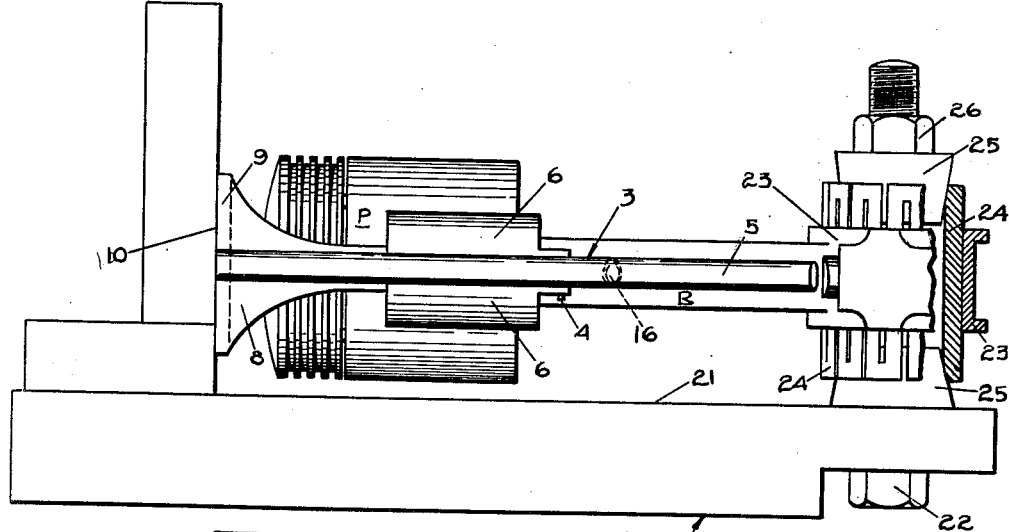
Fig. 2 is a side elevation of the mechanism shown in Figure 1 with a portion of the mechanism in section.
Figure 3:
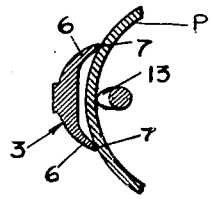
Fig. 3 is a partial sectional view along the lines 3—3 of Figure 1.

The tool itself, generally designated 1, comprises a pair of arms 2, 3, the smaller arm 2 being arranged for movement on a pivot 4 mounted on the target arm 3. The pivot 4 is located substantially centrally of arm 3, the latter being formed with a convenient handle portion 5. The portion of arm 3 on the opposite end is provided with a pair of flanges 6 which curve inwardly toward arm 2. Each flange is formed with a machined surface, as at 7, adapted to lie against the curved outer face of a piston, as will be described. These surfaces are generally convex in cross section, as may be seen in Fig. 3, and extend along the arm for a substantial distance, say 2". Arm 3 also carries an extension 8 on the end of which is integrally formed a perpendicularly extending flat member 9. The member 9 may be approximately 2" x 2" square as seen in Figs. 1 and 2, and is adapted to over lie in spaced relation, the piston, as will be described. The outer face of member 9 is machined to form a flat surface, as at 10.

The machined surface, as at 10, bears an important relationship to the machined surfaces, as at 7, on the flanges 6. They are so arranged as to be perpendicular to one another so that surface 10 will be exactly at right angles to any surface (such as the piston wall) held against the two machined surfaces, as at 7, as will be subsequently described in connection with the use of the device.

The shorter arm 2 of the tool carries an ear 11, drilled to receive the pivot 4 mounted in arm 3. Arm 3 is slotted on the side facing arm 2, as at 12, to receive the ear 11 as it rotates about pivot 4. Arm 2 is also provided with a finger 13 extending beyond the pivot 4 to a point intermediate the flanges 6 and machined surfaces 7. Its opposite end is formed with a handle portion 14, spaced from handle portion 5 for convenient gripping of both in the hand of a user. Each handle portion is provided with a small pin 15 extending toward the other arm and which serves as a mounting for an end of a coil compression spring 16. Spring 16 tends to keep the handle portions apart and causes the gripping action between finger 13 and flanges 6.

The tool is most conveniently utilized in conjunction with a mechanism for mounting the piston P and its associated connecting rod R. This mechanism may take the form of a relatively heavy base 20 formed with a flat machined upper surface, as at 21. One end of the base 20 is drilled to receive a threaded bolt 22, extending therethrough for mounting on a conventional expander unit onto which the crank-shaft bearing 23 is adapted to be secured, as it would be to the crank-shaft. The expander unit is conventional and comprises an expanding sleeve 24 operated by a truncated conical member 25 located at each end as can be seen in Fig. 2. A nut 26 is provided to bear against the upper member 25 and, as the former is screwed on, the members 25 will cause the sleeve to expand against the inner bearing surface of the bearing 23 to hold the connecting rod R and piston P in place. Bolt 22 is of course positioned with its axis at right angles to surface 21 in order that that axis of the bearing 23 will also be exactly perpendicular to the surface 21.

In practice and when it is desired to test the alignment of a piston, the piston is secured, at bearing 23 to the expansion sleeve 24 and the nut 26 tightened to support the rod R and piston P above the surface 21 with the axis of the bearing exactly at right angles thereto.

The tool is then clamped onto the piston in the position shown in the drawings by inserting the gripping finger inside the piston wall and releasing the handles. Spring 16 causes the piston wall to be gripped between gripping finger 13 and the machined surfaces 7 on flanges 6. In this position, member 8 supports the machined surface 9 above the surface 21 of the base 20 at right angles to the piston walls. The operator then places a conventional square S on the surface 21 and brings it into a position adjacent surface 9. It is thus possible to determine whether the two are in alignment. If so, it means that the piston walls are properly positioned with respect to the axis of the bearing 23, i. e., at right angles. If the proper alignment is not shown, the connecting rod may be bent, by means of conventional tools, until the necessary alignment is present. Various positions of the piston, as it rotates on its associated wrist pin 27 may be tested until all are found to be true.

It is now seen that by means of the mechanism described, any type of piston, whether or not it is provided with a flat head, may be easily and quickly tested for alignment. Inasmuch as the tool effectively substitutes the machined surface, as at 10, for the head of the piston, it is unimportant whether the actual piston head is flat, rounded, dome-shaped, etc. Also pistons covered with carbon or otherwise having irregular heads may easily be tested and aligned.

I claim:
1. A clamp for use in testing the alignment of a piston and its associated connecting rod in which said piston has a head at one end and a skirt at the opposite end, said clamp comprising a pair of jaws, means connecting said jaws together for relative movement of said jaws toward and away from each other, one jaw of said pair being adapted to extend into said skirt and formed to make substantially a point contact with the inner side of said skirt, the other jaw being formed with parallel straight edges adapted to engage the outer surface of said skirt along lines parallel with the axis of said piston and at opposite sides of said point of engagement between said one jaw and said skirt, and means for releasably holding said clamp on said skirt with said edges and said one jaw in tight engagement with said skirt, a right angle extension on the outer end of said other jaw adapted to extend over said head of said piston when said straight edges are in engagement with the outer sides of said skirt, said extension being formed with a flat surface at right angles to the axis of said piston when said clamp is secured on the latter.

2. A clamp for use in testing the alignment of a piston and its associated connecting rod in which said piston has a head at one end and a skirt at the opposite end, said clamp comprising a pair of jaws each having a handle extending therefrom, a pivot connecting said jaws at their junctures with their handles, one jaw of said pair being adapted to extend into said skirt and into engagement with the inner side thereof and the other jaw being formed with a pair of parallel, straight edges adapted to engage the outer side of said skirt parallel with the axis of said piston when said one jaw is in engagement with the inner side of said skirt, a right angle extension on the outer end of said outer jaw adapted to extend over said head of said piston when said straight edges are in engagement with the outer sides of said skirt, said extension being formed with a flat surface at right angles to the axis of said piston when said clamp is secured on the latter.

3. A clamp for use in testing the alignment of a piston and its associated connecting rod in which said piston has a head at one end and a skirt at the opposite end, said clamp comprising a pair of jaws each having a handle extending therefrom, a pivot connecting said jaws at their junctures with their handles, one jaw of said pair being adapted to extend into said skirt and into engagement with the inner side thereof and the other jaw being formed with a pair of parallel, straight edges adapted to engage the outer side of said skirt parallel with the axis of said piston when said one jaw is in engagement with the inner side of said skirt, a right angle extension on the outer end of said outer jaw adapted to extend over said head of said piston when said straight edges are in engagement with the outer sides of said skirt, said extension being formed with a flat surface at right angles to the axis of said piston when said clamp is secured on the latter, and said handles extending at an angle to said jaw in a direction away from said piston.

4. A clamp for use in testing the alignment of a piston and its associated connecting rod in which said piston has a head at one end and a skirt at the opposite end, said clamp comprising a pair of jaws each having a handle extending therefrom, a pivot connecting said jaws at their junctures with their handles, one jaw of said pair being adapted to extend into said skirt and into engagement with the inner side thereof and the other jaw being formed with a pair of parallel, straight edges adapted to engage the outer side of said skirt parallel with the axis of said piston when said one jaw is in engagement with the inner side of said skirt, a right angle extension on the outer end of said outer jaw adapted to extend over said head of said piston when said straight edges are in engagement with the outer sides of said skirt, said extension being formed with a flat surface at right angles to the axis of said piston when said clamp is secured on the latter, said one jaw being positioned relative to said straight edges for engaging the inner surface of said skirt at a point between the places where said edges are adapted to engage the outer surface of said skirt.

5. A clamp for use in testing the alignment of a piston and its associated connecting rod in which said piston has a head at one end and a skirt at the opposite end, said clamp comprising a pair of jaws each having a handle extending therefrom, a pivot connecting said jaws at their junctures with their handles, one jaw of said pair being adapted to extend into said skirt and into engagement with the inner side thereof and the other jaw being formed with a pair of parallel, straight edges adapted to engage the outer side of said skirt parallel with the axis of said piston when said one jaw is in engagement with the inner side of said skirt, a right angle extension on the outer end of said outer jaw adapted to extend over said head of said piston when said straight edges are in engagement with the outer sides of said skirt, said extension being formed with a flat surface at right angles to the axis of said piston when said clamp is secured on the latter, said one jaw being formed with an angular projection at its outer end extending generally toward said other jaw, said projection being positioned relative to said straight edges for engaging the inner side of said skirt at a point centrally between the places where said edges are adapted to engage the outer surface of said piston and which point is spaced between the ends of said edges.

6. A clamp for use in testing the alignment of a piston and its associated connecting rod in which said piston has a head at one end and a skirt at the opposite end, said clamp comprising a pair of jaws each having a handle extending therefrom, a pivot connecting said jaws at their junctures with their handles, one jaw of said pair being adapted to extend into said skirt and into engagement with the inner side thereof and the other jaw being formed with a pair of parallel, straight edges adapted to engage the outer side of said skirt parallel with the axis of said piston when said one jaw is in engagement with the inner side of said skirt, a right angle extension on the outer end of said outer jaw adapted to extend over said head of said piston when said straight edges are in engagement with the outer sides of said skirt, said extension being formed with a flat surface at right angles to the axis of said piston when said clamp is secured on the latter, said edges being spaced from said extension and said one jaw being relieved between said edges and said extension to restrict the engagement between said one jaw and said piston to said edges.

7. A clamp for use in testing the alignment of a piston and its associated connecting rod in which said piston has a head at one end and a skirt at the opposite end, said clamp comprising a pair of jaws each having a handle extending therefrom, a pivot connecting said jaws at their junctures with their handles, one jaw of said pair being adapted to extend into said skirt and into engagement with the inner side thereof and the other jaw being formed with a pair of parallel, straight edges adapted to engage the outer side of said skirt parallel with the axis of said piston when said one jaw is in engagement with the inner side of said skirt, a right angle extension on the outer end of said outer jaw adapted to extend over said head of said piston when said straight edges are in engagement with the outer sides of said skirt, said extension being formed with a flat surface at right angles to the axis of said piston when said clamp is secured on the latter, said edges being formed to respectively provide a line contact with the outer surface of said skirt irrespective of irregularities in the diameter of the piston being tested.

8. In combination with a table having a flat upper surface, a post secured to said table projecting from said surface at right angles thereto, means on said post for securing the piston rod bearing of a connecting rod projecting from within the skirt of a piston on said post with said piston rod bearing in axial alignment with said post, said surface extending laterally to one side of said post a sufficient distance to extend beyond a piston when said piston rod bearing is secured on said post with a piston on the connecting rod having said bearing, an element provided with a flat surface, means for securing said element to said piston when said bearing is secured on said post with the flat surface of said element outwardly of said piston relative to said connecting rod and perpendicular to the axis of said piston whereby a try square having one leg flat on said table with the other leg vertical and adjacent said flat surface on said element will give an indication of the alignment or misalignment of said piston relative to said bearing.

9. In combination with a table having a flat upper surface, a post secured to said table projecting from said surface at right angles thereto, means on said post for securing the piston rod bearing of a connecting rod projecting from within the skirt of a piston on said post with said piston rod bearing in axial alignment with said post, said surface extending laterally to one side of said post a sufficient distance to extend beyond a piston when said piston rod bearing is secured on said post with a piston on the connecting rod having said bearing, an element provided with a flat surface, means for securing said element to said piston when said bearing is secured on said post with the flat surface of said element outwardly of said piston relative to said connecting rod and perpendicular to the axis of said piston whereby a try square having one leg flat on said table with the other leg vertical and adjacent said flat surface on said element will give an indication of the alignment or misalignment of said piston relative to said bearing, said means for securing said element to said piston including three spaced projections, two of said spaced projections being adapted to engage said piston at one side of the wall of said skirt and the other element being adapted to engage said wall at the side thereof opposite said two projections and at a point equally spaced from said two projections.

EDWARD E. WOODWARD.

(References on following page)

REFERENCES CITED

The following references are of record in the file of this patent:

UNITED STATES PATENTS

| Number | Name | Date |
|---|---|---|
| 558,417 | Paull | Apr. 14, 1896 |
| 1,543,812 | Addis | June 30, 1925 |
| 1,643,359 | Aab | Sept. 27, 1927 |
| 1,801,270 | Gray et al. | Apr. 21, 1931 |
| 1,805,475 | Anderson | May 19, 1931 |
| 1,990,138 | Schuster | Feb. 5, 1935 |
| 2,013,374 | Zimmerman | Sept. 13, 1935 |
| 2,461,783 | Stark | Feb. 15, 1949 |

FOREIGN PATENTS

| Number | Country | Date |
|---|---|---|
| 1,600 | Great Britain | Jan. 21, 1902 |